(12) United States Patent
Oh et al.

(10) Patent No.: US 7,486,876 B2
(45) Date of Patent: Feb. 3, 2009

(54) OPTICAL RECORDING MEDIUM AND APPARATUS AND METHOD TO PLAY THE OPTICAL RECORDING MEDIUM

(75) Inventors: Yeong-heon Oh, Seoul (KR); Young-ki Byun, Gyeonggi-do (KR); Jeong-joo Jeong, Gyeonggi-do (KR); Young-ho Jung, Seoul (KR)

(73) Assignees: Samsung Electronics Co., Ltd., Suwon-Si (KR); Bitwin Corporation, Seoul (KR)

( * ) Notice: Subject to any disclaimer, the term of this patent is extended or adjusted under 35 U.S.C. 154(b) by 174 days.

(21) Appl. No.: 10/144,769

(22) Filed: May 15, 2002

(65) Prior Publication Data

US 2003/0099464 A1    May 29, 2003

(30) Foreign Application Priority Data

Nov. 29, 2001   (KR) .................................. 2001-74965

(51) Int. Cl.
H04N 5/00   (2006.01)
(52) U.S. Cl. ..................... 386/120; 386/112; 386/121; 386/124; 348/220
(58) Field of Classification Search ................. 386/125, 386/126, 105, 68, 46–45, 95, 96, 97, 111, 386/112, 82, 104, 98
See application file for complete search history.

(56) References Cited

U.S. PATENT DOCUMENTS 4,673,266 A * 6/1987 Fiumi ........................... 352/90

5,497,241 A    3/1996 Ostrover et al.
5,652,824 A *  7/1997 Hirayama et al. ............. 386/95
5,666,451 A    9/1997 Kim (Continued)

FOREIGN PATENT DOCUMENTS

EP      863 509      11/1996

(Continued)

OTHER PUBLICATIONS

Substantive Examination: Examiner's Report to the Registrar Under Section 30(1) / 30(2) with a Search Report attached (2 pages).

(Continued)

*Primary Examiner*—John W. Miller
*Assistant Examiner*—Jamie Jo Vent
(74) *Attorney, Agent, or Firm*—Staas & Halsey LLP

(57) ABSTRACT

An optical recording medium for recording a predetermined subtitle code in a predetermined region in which contents are stored, and an apparatus and method to play the optical recording medium which are capable of displaying a subtitle on a screen when the contents are played. The method of playing an optical recording medium includes analyzing a stream that is read from the optical recording medium, and searching whether a predetermined subtitle code is recorded in a reserved region in a predetermined stream, storing the searched predetermined subtitle code and outputting the stored predetermined subtitle code with a command execution key, and signal-processing the predetermined subtitle code that is output with the command execution key, and displaying the signal-processed predetermined subtitle code on a screen of the played optical recording medium.

15 Claims, 5 Drawing Sheets

U.S. PATENT DOCUMENTS

| | | | |
|---|---|---|---|
| 5,731,847 A * | 3/1998 | Tsukagoshi | 348/589 |
| 5,835,669 A * | 11/1998 | Hirayama et al. | 386/97 |
| 5,848,217 A * | 12/1998 | Tsukagoshi et al. | 386/68 |
| 5,963,704 A * | 10/1999 | Mimura et al. | 386/95 |
| 6,108,281 A | 8/2000 | Tozaki et al. | |
| 6,285,823 B1 * | 9/2001 | Saeki et al. | 386/95 |
| 6,377,518 B1 * | 4/2002 | Auwens et al. | 369/30.04 |
| 6,442,333 B1 | 8/2002 | Izawa | |
| 6,449,227 B1 * | 9/2002 | Heo | 369/47.15 |
| 6,519,413 B1 * | 2/2003 | Ando et al. | 386/95 |
| 6,577,812 B1 * | 6/2003 | Kikuchi et al. | 386/105 |
| 6,665,241 B2 * | 12/2003 | Heo | 369/47.15 |
| 7,075,587 B2 * | 7/2006 | Lee | 348/563 |

FOREIGN PATENT DOCUMENTS

| | | |
|---|---|---|
| EP | 755 161 | 1/1997 |
| EP | 0 871 160 | 10/1998 |
| EP | 0 903 732 | 3/1999 |
| EP | 0 926 680 | 6/1999 |
| EP | 1 102 249 | 5/2001 |
| JP | 09-231726 | 9/1997 |
| JP | 10-075448 | 3/1998 |
| JP | 10-215409 | 8/1998 |
| JP | 11-162120 | 8/1999 |
| JP | 2001-006295 | 1/2001 |
| JP | 2001-036865 | 2/2001 |
| JP | 2001-126398 | 5/2001 |
| JP | 2002-118821 | 4/2002 |

OTHER PUBLICATIONS

Counterpart Foreign Application GB 2 382 715 A, Published Jun. 4, 2003.
Affidavit with English translation.
Combined Search and Examination Report.
Japanese Office Action for Application No. 2002-124761.

* cited by examiner

FIG. 4

| RBP | Contents | | Number of bytes |
|---|---|---|---|
| 0 to 11 | VTS_ID | VTS Identifier | 12 bytes |
| 12 to 15 | VTS_EA | End address of VTS | 4 bytes |
| 16 to 27 | reserved | reserved | 12 bytes |
| 28 to 31 | VTSI_EA | End address of VTSI | 4 bytes |
| 32 to 33 | VERN | Version number of DVD Video Specification | 2 bytes |
| 34 to 37 | VTS_CAT | VTS Category | 4 bytes |
| 38 to 127 | reserved | reserved | 90 bytes |
| 128 to 131 | VTSI_MAT_EA | End address of VTSI_MAT | 4 bytes |
| 132 to 191 | reserved | reserved | 60 bytes |
| 192 to 195 | VTSM_VOBS_SA | Start address of VTSM_VOBS | 4 bytes |
| 196 to 199 | VTSTT_VOBS_SA | Start address of VTSTT_VOBS | 4 bytes |
| 200 to 203 | VTS_PTT_SRPT_SA | Start address of VTS_PTT_SRPT | 4 bytes |
| 204 to 207 | VTS_PGCIT_SA | Start address of VTS_PGCIT | 4 bytes |
| 208 to 211 | VTSM_PGCI_UT_SA | Start address of VTSM_PGCI_UT | 4 bytes |
| 212 to 215 | VTS_TMAPT_SA | Start address of VTS_TMAPT | 4 bytes |
| 216 to 219 | VTSM_C_ADT_SA | Start address of VTSM_C_ADT | 4 bytes |
| 220 to 223 | VTSM_VOBU_ADMAP_SA | Start address of VTSM_VOBU_ADMAP | 4 bytes |
| 224 to 227 | VTS_C_ADT_SA | Start address of VTS_C_ADT | 4 bytes |
| 228 to 231 | VTS_VOBU_ADMAP_SA | Start address of VTS_VOBU_ADMAP | 4 bytes |
| 232 to 255 | reserved | reserved | 24 bytes |
| 256 to 257 | VTSM_V_ATR | Video attribute of VTSM | 2 bytes |
| 258 to 259 | VTSM_AST_Ns | Number of Audio streams of VTSM | 2 bytes |
| 260 to 267 | VTSM_AST_ATR | Audio stream attribute of VTSM | 8 bytes |
| 268 to 323 | reserved | reserved | 56 bytes |
| 324 to 339 | reserved | reserved | 16 bytes |
| 340 to 341 | VTSM_SPST_Ns | Number of Sub-picture streams of VTSM | 2 bytes |
| 342 to 347 | VTSM_SPST_ATR | Sub-picture stream attribute of VTSM | 6 bytes |
| 348 to 511 | reserved | reserved | 164 bytes |
| 512 to 513 | VTS_V_ATR | Video attribute of VTS | 2 bytes |
| 514 to 515 | VTS_AST_Ns | Number of Audio streams of VTS | 2 bytes |
| 516 to 579 | VTS_AST_ATRT | Audio stream attribute table of VTS | 64 bytes |
| 580 to 595 | reserved | reserved | 16 bytes |
| 596 to 597 | VTS_SPST_Ns | Number of Sub-picture streams of VTS | 2 bytes |
| 598 to 789 | VTS_SPST_ATRT | Sub-picture stream attribute table of VTS | 192 bytes |
| 790 to 791 | reserved | reserved | 2 bytes |
| 792 to 983 | VTS_MU_AST_ATRT | Multichannel Audio stream attribute table of VTS | 192 bytes |
| 984 to 1023 | reserved | reserved | 40 bytes |
| 1024 to 2047 | reserved | reserved | 1024 bytes |

FIG. 5

| RBP | | Contents | Number of bytes |
|---|---|---|---|
| 0 to 11 | VMG_ID | VMG Identifier | 12 bytes |
| 12 to 15 | VMG_EA | End address of VMG | 4 bytes |
| 16 to 27 | reserved | reserved | 12 bytes |
| 28 to 31 | VMGI_EA | End address of VMGI | 4 bytes |
| 32 to 33 | VERN | Version number of DVD Video Specifications | 2 bytes |
| 34 to 37 | VMG_CAT | Video Manager Category | 4 bytes |
| 38 to 45 | VLMS_ID | Volume Set Identifier | 8 bytes |
| 46 to 47 | ADP_ID | Adaptation Identifier | 2 bytes |
| 48 to 49 | reserved | reserved | 2 bytes |
| 50 to 61 | reserved | reserved | 12 bytes |
| 62 to 63 | VTS_Ns | Number of Video Title Sets | 2 bytes |
| 64 to 95 | PVR_ID | Provider unique ID | 32 bytes |
| 96 to 103 | POS_CD | POS Code | 8 bytes |
| 104 to 127 | reserved | reserved | 24 bytes |
| 128 to 131 | VMGI_MAT_EA | End address of VMGI_MAT | 4 bytes |
| 132 to 135 | FP_PGCI_SA | Start address of FP_PGCI | 4 bytes |
| 136 to 191 | reserved | reserved | 56 bytes |
| 192 to 195 | VMGM_VOBS_SA | Start address of VMGM_VOBS | 4 bytes |
| 196 to 199 | TT_SRPT_SA | Start address of TT_SRPT | 4 bytes |
| 200 to 203 | VMGM_PGCI_UT_SA | Start address of VMGM_PGCI_UT | 4 bytes |
| 204 to 207 | PTL_MAIT_SA | Start address of PTL_MAIT | 4 bytes |
| 208 to 211 | VTS_ATRT_SA | Start address of VTS_ATRT | 4 bytes |
| 212 to 215 | TXTDT_MG_SA | Start address of TXTDT_MG | 4 bytes |
| 216 to 219 | VMGM_C_ADT_SA | Start address of VMGM_C_ADT | 4 bytes |
| 220 to 223 | VMGM_VOBU_ADMAP_SA | Start address of VMGM_VOBU_ADMAP | 4 bytes |
| 224 to 255 | reserved | reserved | 32 bytes |
| 256 to 257 | VMGM_V_ATR | Video attribute of VMGM | 2 bytes |
| 258 to 259 | VMGM_AST_Ns | Number of Audio streams of VMGM | 2 bytes |
| 260 to 267 | VMGM_AST_ATR | Audio stream attribute of VMGM | 8 bytes |
| 268 to 323 | reserved | reserved | 56 bytes |
| 324 to 339 | reserved | reserved | 16 bytes |
| 340 to 341 | VMGM_SPST_Ns | Number of Sub-picture streams of VMGM | 2 bytes |
| 342 to 347 | VMGM_SPST_ATR | Sub-picture stream attribute of VMGM | 6 bytes |
| 348 to 1023 | reserved | reserved | 676 bytes |
| 1024 to 1231 max | FP_PGCI | First Play PGCI | 0 or (256 to 1268) bytes |

OPTICAL RECORDING MEDIUM AND APPARATUS AND METHOD TO PLAY THE OPTICAL RECORDING MEDIUM

CROSS-REFERENCE TO RELATED APPLICATION

This application claims the benefit of Korean Application No. 2001-74965, filed Nov. 29, 2001, in the Korean Intellectual Property Office, the disclosure of which is incorporated herein by reference.

BACKGROUND OF THE INVENTION

1. Field of the Invention

The present invention relates to an optical recording medium on which is recorded a predetermined subtitle code in a predetermined region in which contents are stored, and an apparatus and method of playing the optical recording medium and which is capable of displaying sub-titles on a screen when the contents are played.

2. Description of the Related Art

In general, a digital versatile disc (DVD) is the same size as a compact disc (CD) having a diameter of 12 cm and a thickness of 1.2 mm. However, a DVD is capable of storing 7 times as much data as a CD. Specifically, the CD has a capacity to store enough data to be played for 74 minutes (i.e., a capacity of 688 megabytes). In contrast, the DVD has a capacity of 4.7-17 gigabytes, depending on whether the DVD is single sided or double sided and whether it has a single layer or multiple layers.

Since the DVD has a large capacity, the DVD can provide better video than the CD. The DVD need not use a moving picture experts group (MPEG)-1 compression method, which places more weight on high compression than on picture quality, and can instead use an MPEG-2 compression method, which places more weight on picture quality.

By providing audio and subtitles and by assigning a space in which information including all kinds of set-up menus are stored, many functions can be provided. These functions include interactive (conversation-type) progress function to reproduce contents according to a user's selection, a multilingual subtitle processing function to display a maximum of 32 languages, a multilingual speech processing function to provide sound tracks in a maximum of 8 languages, a digital surround function that is provided through six speakers (e.g., front-right, front-left, back-right, back-left, central, middle, and low frequency speakers), a multi-story function in which a user can select from many preset stories in the case of a movie, a multi-angle function in which a scene that is filmed in various angles is provided, and a viewer can select a desired angle and can view a scene from that angle, and a viewing-restriction function to restrict viewing by grading each scene.

Among set-up menus of the DVD, there is a sub-title menu to set the language and the subtitles. The sub-title menu is useful and is often used to allow a user to enjoy various discs in different languages. However, in a conventional DVD, only a subtitle that is designated with a simple subtitle key or menu is displayed. Thus, a user's selection of subtitles is reduced and a learning function cannot be enhanced.

SUMMARY OF THE INVENTION

To solve the above and other problems, it is an object of the present invention to provide an optical recording medium on which a predetermined subtitle code is recorded in a predetermined region in which contents are stored, so that a predetermined subtitle is displayed on a screen when the contents are played.

It is another object of the present invention to provide an apparatus to play an optical recording medium and which executes a predetermined subtitle that is recorded in a predetermined region of the optical recording medium on which contents are stored so that the predetermined subtitle is displayed on a screen when the optical recording medium is played.

It is a further object of the present invention to provide a method of playing an optical recording medium, the method including executing a predetermined subtitle that is recorded in a predetermined region of the optical recording medium on which contents are stored so that the predetermined subtitle is displayed on a screen when the optical recording medium is played.

Additional objects and advantages of the invention will be set forth in part in the description which follows and, in part, will be obvious from the description, or may be learned by practice of the invention.

Accordingly, to achieve the above and other objects, an optical recording medium according to an embodiment of the invention includes a subtitle code recorded thereon and including information such that, upon being read by a reproducing apparatus, a marking and the subtitle code are displayed with contents on a screen, the subtitle code being in a reserved region in a packet containing the contents.

According to an aspect of the invention, the marking is an identification code to indicate that the subtitle is recorded on the optical recording medium, and the marking and the subtitle code are recorded in the reserved region of a predetermined information table, which is used to play the contents recorded on the optical recording medium.

According to another aspect of the invention, the marking and the subtitle code are recorded in the reserved region of a predetermined presentation control information (PCI) packet or a data search information (DSI) packet, which are used to play the contents recorded on the optical recording medium.

According to an additional embodiment of the invention, an apparatus to play an optical recording medium on which an identification code and a subtitle code are recorded in a reserved region within a stream of contents, the apparatus including a signal processor to read the stream including the identification code and the subtitle code from the optical recording medium and to signal-process the read stream to be displayed on a screen, and a controller to analyze the read stream of the contents to determine whether the subtitle code is recorded in the reserved region and to control the display of the subtitle according to whether the subtitle code is recorded.

According to an aspect of the invention, the controller searches to determine whether the predetermined subtitle code is recorded based upon whether the identification code is recorded in the reserved region of the recording medium, where the identification code indicates that the subtitle code is recorded on the optical recording medium.

According to another aspect of the invention, the identification code and the subtitle code are in the reserved region of a predetermined information table, which is used to play the contents recorded on the optical recording medium.

According to yet another aspect of the invention, the identification code and the subtitle code are in the reserved region of a predetermined presentation control information (PCI) packet or data search information (DSI) packet, which are used to play the contents of the optical recording medium.

According to a further embodiment of the invention, a method of playing an optical recording medium includes analyzing a stream of contents that is read from the optical recording medium, determining whether a subtitle code is recorded in a reserved region in the read stream, if the subtitle code is recorded, storing the subtitle code, outputting the stored subtitle code when a command execution key is activated, signal-processing the output subtitle code, and displaying the signal-processed subtitle code on a screen on which the contents of the played optical recording medium are displayed.

According to an aspect of the invention, the analyzing the stream includes searching to determine whether the subtitle code is recorded based upon whether an identification code is recorded in the reserved region, where the identification code indicates that the predetermined subtitle code is recorded on the optical recording medium.

According to an additional aspect of the invention, the identification code and the predetermined subtitle code are in the reserved region of a predetermined information table, which is used to play the optical recording medium.

According to yet an additional aspect of the invention, the identification code and the subtitle code are in the reserved region of a presentation control information (PCI) packet or a data search information (DSI) packet, which are used to play the contents stored on the optical recording medium.

BRIEF DESCRIPTION OF THE DRAWINGS

The above and other objectives and advantages of the present invention will become more apparent and more readily appreciated by describing in detail embodiments thereof with reference to the accompanying drawings in which:

FIGS. 4 and 5 show a VTSI_MAT and a VMGI_MAT including the reserved regions used according to embodiments of the invention.

DETAILED DESCRIPTION OF THE EMBODIMENTS

Figure 1:
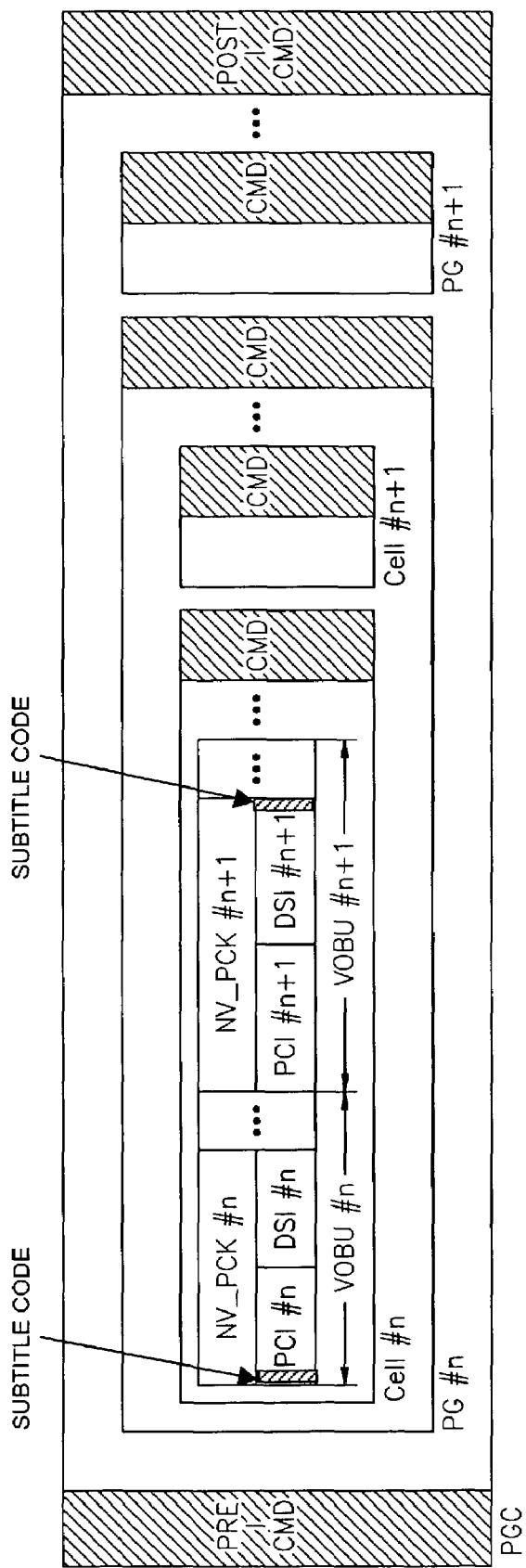
FIG. 1 illustrates the format of a signal recorded on an optical recording medium according to an embodiment of the present invention.

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

Figure 2:
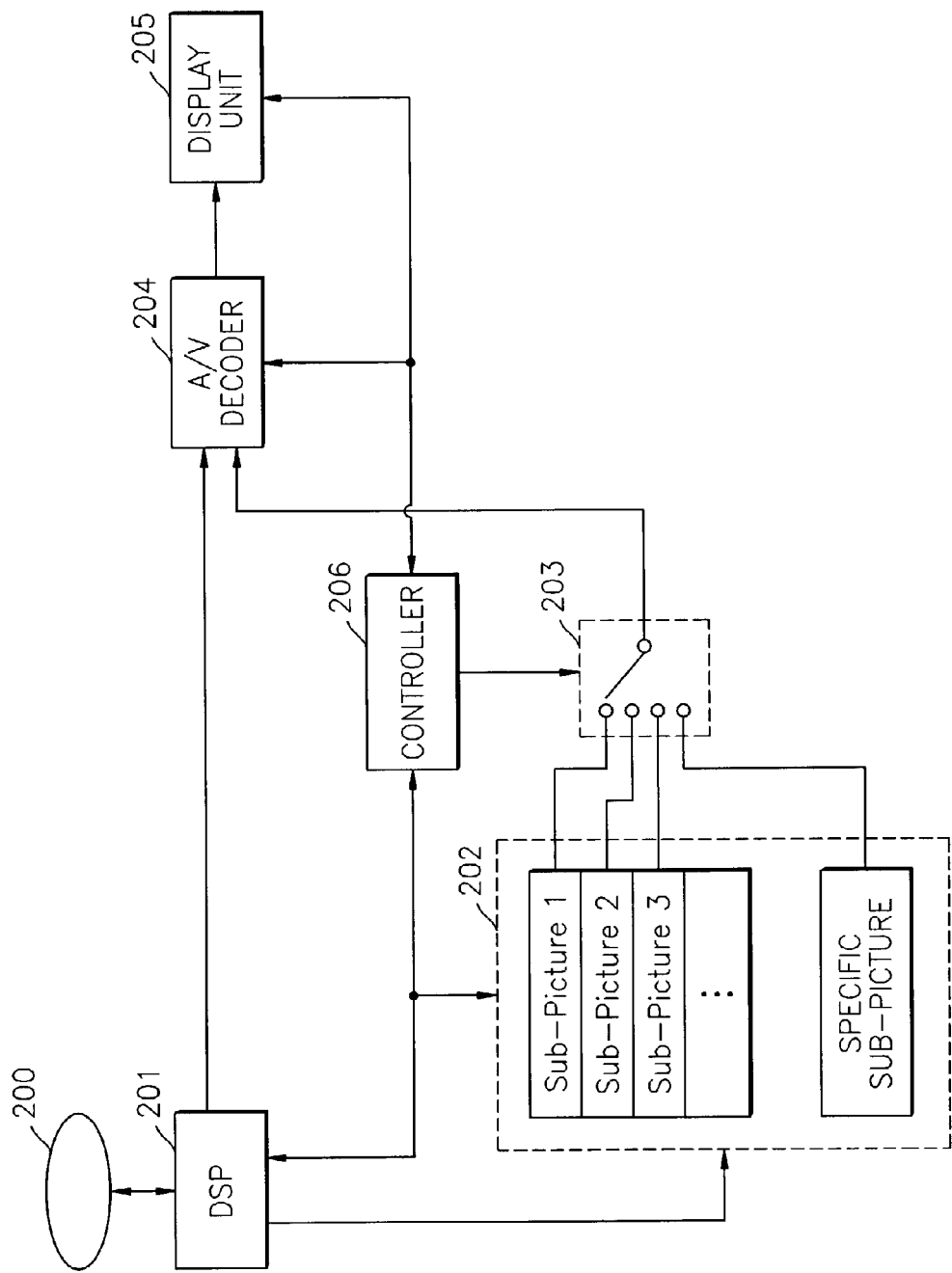
FIG. 2 is a block diagram illustrating the structure of an apparatus to play the optical recording medium according to an embodiment of the present invention.

FIG. 1 illustrates the format of a signal recorded on an optical recording medium according to an embodiment of the present invention. FIG. 2 is a block diagram illustrating the structure of an apparatus to play the optical disc 200 according to the present invention, the apparatus including a DSP 201, a memory 202, a switching unit 203, an A/V decoder 204, a display unit 205, and a controller 206.

Figure 3:
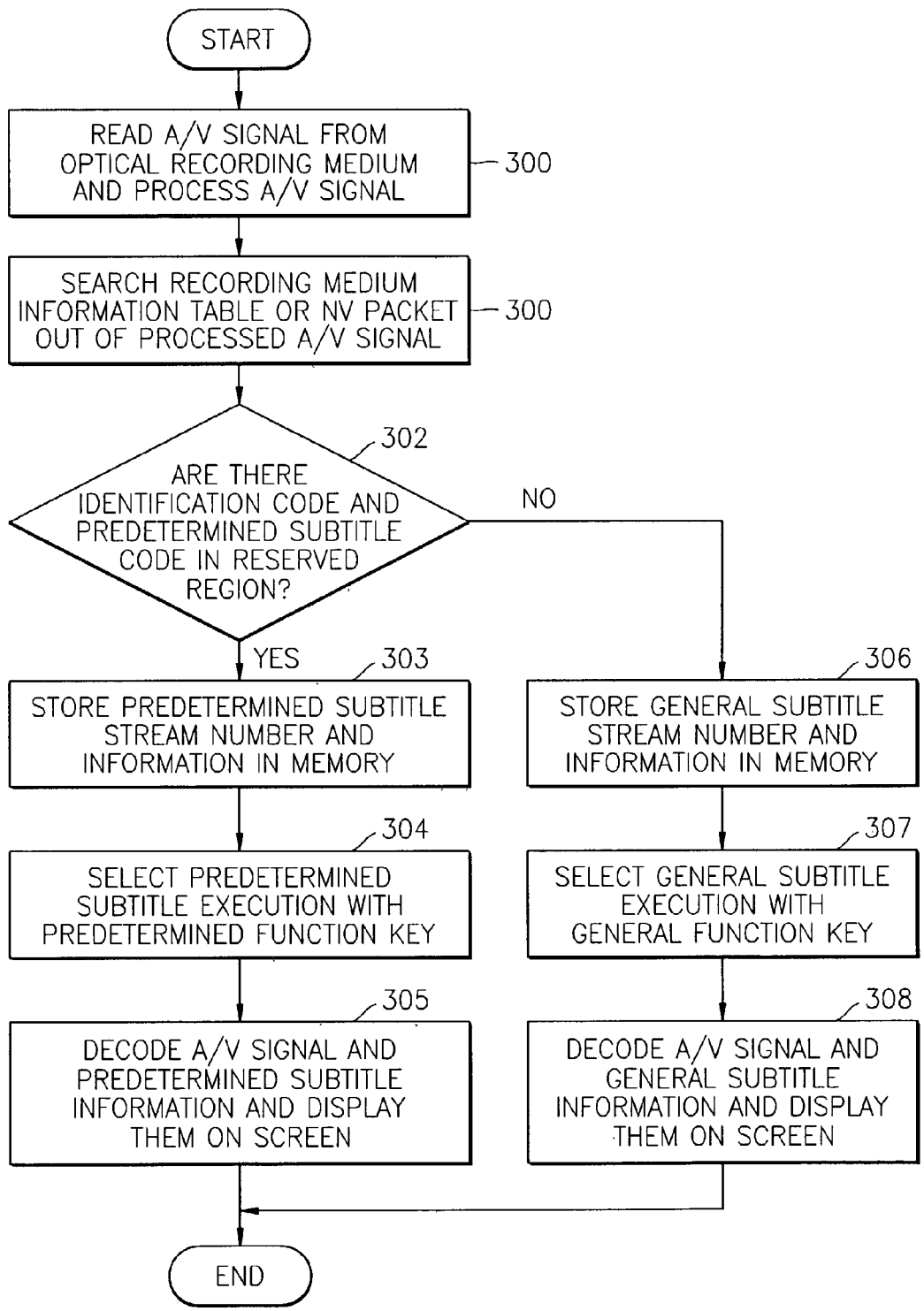
FIG. 3 is a flowchart of a method of playing the optical recording medium according to an embodiment of the present invention.

FIG. 3 is a flowchart of a method of playing the optical recording medium according to an embodiment of the present invention. The method includes reading an A/V signal from the optical recording medium and processing the A/V signal (300), searching for a recording medium information table or an NV packet in the processed A/V signal (301), determining whether there is an identification code and a predetermined subtitle code in a reserved region (302), storing the predetermined subtitle stream code and predetermined subtitle information in a memory 202 (303), selecting predetermined subtitle execution upon activation of a predetermined function key (304), decoding the processed A/V signal and the predetermined subtitle information and displaying the decoded A/V signal and the subtitle information on a screen of the display 205 (305), storing a general subtitle stream number and general subtitle information in the memory 202 (306), selecting general subtitle execution with a general function key (307), and decoding an A/V signal and the general subtitle information and displaying the decoded A/V signal and the subtitle information on the screen (308).

Hereinafter, the present invention will be described in detail with reference to FIGS. 1 through 3. In FIG. 1, a video object unit (VOBU) is recorded on the optical disc 200, or is a minimum unit of a played MPEG stream. A cell includes a predetermined number of VOBUs, a page (PG) includes a predetermined number of cells, and a page chain (PGC), which is a maximum unit of the played MPEG stream, includes a predetermined number of PGs.

The VOBU includes a predetermined number of navigation (NV) packets. Each of the NV packets includes a presentation control information (PCI) packet and a data search information (DSI) packet. The PCI packet includes a total of 60 bytes and stores presentation control information such as highlight information, VOBU category information and non seamless angle information. 32 bytes of the 60 bytes is a reserved region. The DSI packet includes a total of 1017 bytes and stores data search information such as VOBU category information and seamless angle information. 471 bytes of the 1017 bytes is a reserved region.

When contents are recorded on the optical disc 200, an identification code and a predetermined subtitle code are inserted in the reserved regions of the PCI packet and the DSI packet, and thereby the predetermined subtitle code is displayed on a screen when the contents are played according to an embodiment of the invention. Here, the predetermined subtitle code is not a conventional designated subtitle code, but is instead a new subtitle code. For example, in a case where a designated subtitle is in Korean, English, and Japanese, the predetermined subtitle code that is supported by the present invention may be in Korean plus English, Korean plus Japanese, and English plus Japanese according to embodiments of the invention. The identification code, which is inserted in the reserved regions of the PCI packet and the DSI packet, indicates that the predetermined subtitle code is recorded on the optical disc 200.

There are volume information tables in the optical disc 200. Information required to play the contents of the optical disc 200 is stored in the volume information tables. The volume information tables include a video title set information (VTSI) management table as shown in FIG. 4, and a video manager information (VMGI) management table as shown in FIG. 5. The identification code and the predetermined subtitle code are recorded in the reserved regions of the VTSI and VMGI management tables according to another embodiment of the invention.

The VTSI management table is a table in which video title set information is stored. The VTSI management table includes a total of 2047 bytes. Among the total of 2047 bytes, there are reserved regions in locations such as 16-27 bytes, 232-255 bytes, 268-339 bytes, 348-511 bytes, 580-595 bytes, 790-791 bytes, and 984-2047 bytes. The identification code and the predetermined subtitle code are recorded in one or more of these locations according to an embodiment of the invention.

The VMGI management table is a table in which video manager information is stored. The VMGI management table includes a total of 2291 bytes. Among the total of 2291 bytes, there are reserved regions at locations such as such as 16-27 bytes, 48-61 bytes, 104-127 bytes, 136-191 bytes, 224-255 bytes, 268-339 bytes, and 349-1023 bytes. The identification code and the predetermined subtitle code are recorded in one or more of these locations according to an embodiment of the invention.

The apparatus and method to play the optical disc 200 on which a predetermined command and a code to identify the predetermined command are recorded will be described below with reference to FIGS. 2 and 3.

In operation 300, an A/V signal is read from the optical disc 200 and is processed. Reading the A/V signal from the optical disc 200 is performed by a pickup (not specifically shown) that is included with the DSP 201, and the A/V signal read by the pickup is descrambled and then eight-to-fourteen modulated (EFM) in the DSP 201.

In operations 301 and 302, a recording medium information table or an NV packet out of the A/V signal that is signal-processed in the DSP 201 is analyzed. It is determined whether there are an identification code and a predetermined subtitle code in a reserved region of either the recording medium information table or the NV packet. The controller 206 analyzes the recording medium information table or the NV packet and determines whether the predetermined subtitle code is in the reserved region based upon the identification code.

In operation 303, when the predetermined subtitle code is in the reserved region, the predetermined subtitle code is stored in the memory 202. The controller 206 stores the subtitle code with any other subtitle codes in the memory 202 sorted by each number. As shown in FIG. 2, the memory 202 is divided into a plurality of regions, such as sub-picture 1, sub-picture 2, etc. Each of the subtitles is stored in a separate corresponding region. Of these regions, there is a separate region in which the predetermined subtitle code is stored. Thus, the predetermined subtitle code and information are stored in the memory 202. The controller 206 determines whether the predetermined subtitle code is inserted in the reserved region with the identification code, indicates to a user the result of determination, and waits for a predetermined function key to be entered to execute the predetermined subtitle display. The indication that the predetermined subtitle code is inserted in the reserved region can be through the screen, a display on the disk player, using lights, sounds, or other similar mechanisms by which a user is informed of a status of an apparatus.

In operation 304, a user enters the predetermined function key and selects the predetermined subtitle execution. If the predetermined function key is entered, the controller 206 outputs a switching control signal to select the predetermined subtitle code number. The switching unit 203 switches to a port for the predetermined subtitle code number so that the predetermined subtitle code information is output from the memory 202.

If predetermined subtitle execution is selected, in operation 305, the A/V signal and the predetermined subtitle information are decoded in the A/V decoder 204 and are output to the display unit 205 to be displayed on the screen of the display unit 205.

When it is determined that there is no identification code and no predetermined subtitle code recorded in the reserved region, in operation 306, a general subtitle stream number and information are stored in the memory 202. A general subtitle is stored in a sub-picture 1, a sub-picture 2, etc, of the memory 202 excluding the predetermined subtitle code region.

In operation 307, a desired general subtitle execution is selected with a general function key. If the general function key is entered, the controller 206 outputs a switching control signal to select the one of the general subtitle code numbers that is selected by a user. The switching unit 203 switches to a port for the selected one general subtitle code number so that the general subtitle code information that is selected by the user is output from the memory 202.

If the general subtitle execution is selected, in operation 308, the A/V signal and the general subtitle information are decoded in the A/V decoder 204 and are output to the display unit 205.

As described above, according to the present invention, a predetermined subtitle can be displayed on a screen by executing the predetermined subtitle that is recorded in a predetermined region when an optical recording medium is played. This extends a user's selection of subtitles and enhances a learning effect.

While shown in terms of a stream read from an optical recording medium, it is understood that the stream can also be transmitted instead of or in addition to being recorded on an optical recording medium.

It is understood that the controller 205 and/or the decoder 202 can be implemented using a computer, and that the method shown in FIG. 3 can be implemented using a computer program encoded on a computer readable medium to be executed by the computer. Further, it is understood that the subtitle could also be in graphical or animated form to further enhance the learning effect.

While this invention has been particularly shown and described with reference to preferred embodiments thereof, it will be understood by those skilled in the art that various changes in form and details may be made therein without departing from the spirit and scope of the invention as defined by the accompanying claims and equivalents thereof.

What is claimed is:

1. A computer readable medium on which data is recorded, the data comprising:
    contents;
    a predetermined subtitle code stored in a reserved region in a packet of said contents; and
    a marking indicating that the predetermined subtitle code is recorded on the medium,
    wherein said marking and said predetermined subtitle code are recorded in the reserved region, and the predetermined subtitle code are displayed with said contents on a screen according to whether the marking is recorded in the reserved region of the stream,
    the reserved region is one of a predetermined information table, a presentation control information (PCI) packet, and a data search information (DSI) packet, and the predetermined information table is used to play the contents of the medium and the PCI and DSI packets are used to play the contents stored on the medium, and
    the predetermined subtitle code indicates a subtitle to be displayed in two or more languages simultaneously on the screen.

2. The computer readable medium of claim 1, wherein said marking is an identification code.

3. An apparatus to play a computer readable medium, the apparatus:
    a signal processor to read a stream of contents from the medium, the stream including an identification code and a predetermined subtitle code recorded in a reserved region, and to signal process the read stream to be displayed on a screen;

a controller to determine whether the predetermined subtitle code is recorded according to whether the identification code is recorded in the reserved region of the stream of contents, to control the display of the predetermined subtitle code if the identification code is recorded, and to control the display of a general subtitle code if the identification code is not recorded in the reserved region, the reserved region is one of a predetermined information table, a presentation control information (PCI) packet, and a data search information (DSI) packet, and the predetermined information table is used to play the contents of the medium and the PCI and DSI packets are used to play the contents stored on the medium, the reserved region is in a predetermined information table, the predetermined information table being used to play the contents of the medium, and the predetermined subtitle code indicates a subtitle to be displayed in two or more languages simultaneously on the screen.

4. The apparatus of claim 3, wherein the identification code indicates that the predetermined subtitle code is recorded on the medium.

5. A method of playing a computer readable medium, the method comprising:

analyzing a stream of contents that is read from the medium;

determining whether a predetermined subtitle code is recorded according to whether a identification code is recorded in the reserved region of the stream;

if the identification code is recorded in the reserved region, storing the predetermined subtitle code;

outputting the stored predetermined subtitle code if a command execution key is activated;

signal-processing the outputted predetermined subtitle code; and displaying the signal-processed predetermined subtitle code on a screen on which the contents of the played medium are displayed; and if the identification code is not recorded in the reserved region, storing a general subtitle code other than the predetermined subtitle code;

outputting the stored general subtitle code if a command execution key is activated;

signal-processing the outputted general subtitle code; and displaying the signal-processed general subtitle code on a screen on which the contents of the played medium are displayed, wherein, the reserved region is one of a predetermined information table, a presentation control information (PCI) packet, and a data search information (DSI) packet, and the predetermined information table is used to play the contents of the medium and the PCI and DSI packets are used to play the contents stored on the medium, and the predetermined subtitle code indicates a subtitle to be displayed in two or more languages simultaneously on the screen.

6. The method of claim 5, wherein the identification code indicates that the predetermined subtitle code is recorded on the medium when having a first value, and indicates that the predetermined subtitle code is not recorded on the medium when having a second value other than the first value.

7. A computer readable medium on which data is recorded, the data comprising:

contents;

a predetermined subtitle code and a marking stored in a reserved region of one of a packet, a video title set information (VTSI) management table, or a video manager information (VMGI) management table, wherein the predetermined subtitle code are displayed with said contents on a screen according to whether said marking is recorded in the reserved region of the stream, said marking is an identification code to indicate that said predetermined subtitle code is recorded on the medium when having a first value, and indicates that the predetermined subtitle code is not recorded on the medium when having a second value other than the first value, and the predetermined subtitle code indicates a subtitle to be displayed in two or more languages simultaneously on the screen.

8. The computer readable medium of claim 7, wherein:

said marking and said predetermined subtitle code are recorded in the reserved region of the packet, the packet is a navigation (NV) packet comprises a presentation control information (PCI) packet and a data search information (DSI) packet, and said marking and said predetermined subtitle code are recorded in one of the PCI packet or the DSI packet.

9. The computer readable medium of claim 7, wherein:

said marking and said predetermined subtitle code are recorded in the reserved region of the VTSI management table, the VTSI management table includes a total of 2047 bytes, and said marking and said predetermined subtitle code are recorded in one or more of the regions at 16-27 bytes, 232-255 bytes, 268-339 bytes, 348-511 bytes, 580-595 bytes, 790-791 bytes, and 984-2047 bytes.

10. The computer readable medium of claim 7, wherein:

said marking and said predetermined subtitle code are recorded in the reserved region of the VMGI management table, the VMGI management table includes a total of 2291 bytes, and said marking and said predetermined subtitle code are recorded in one or more of the regions at 16-27 bytes, 48-61 bytes, 104-127 bytes, 136-191 bytes, 224-255 bytes, 268-339 bytes, and 349-1023 bytes.

11. The computer readable medium of claim 7, wherein:

one of the two or more languages is one of English, Korean, or Japanese, and another of the two or the languages is another one of English, Korean, or Japanese.

12. The computer readable medium of claim 1, wherein the predetermined subtitle code comprises a plurality of languages that are simultaneously displayed while the contents are displayed.

13. The computer readable medium of claim 1, wherein the marking comprises a code selectable to indicate first and second indications, where the first indication indicates that a general subtitle code is encoded on the medium and that the marking is not to be displayed, and a second indication indicating that the predetermined subtitle code is encoded on the medium and that the marking is to be displayed.

14. The apparatus of claim 3, wherein said controller, if the identification code indicates that the predetermined subtitle code is not recorded in the reserved region, displays a general subtitle code read from the medium.

15. The computer readable medium of claim 14, wherein the predetermined subtitle code comprises a plurality of languages that are simultaneously displayed while the contents are displayed, and the general subtitle code comprises a single language displayed without another language while the contents are displayed.

* * * * *

UNITED STATES PATENT AND TRADEMARK OFFICE
CERTIFICATE OF CORRECTION

PATENT NO. : 7,486,876 B2  Page 1 of 1
APPLICATION NO. : 10/144769
DATED : February 3, 2009
INVENTOR(S) : Yeong-heon Oh et al.

It is certified that error appears in the above-identified patent and that said Letters Patent is hereby corrected as shown below:

Column 6, Line 65 claim 3, change "apparatus:" to --apparatus comprising:--.

Signed and Sealed this

Fourteenth Day of April, 2009

JOHN DOLL
*Acting Director of the United States Patent and Trademark Office*